(12) United States Patent  
Branover et al.

(10) Patent No.: US 9,383,801 B2  
(45) Date of Patent: Jul. 5, 2016

(54) METHODS AND APPARATUS RELATED TO PROCESSOR SLEEP STATES

(71) Applicants: Alexander J. Branover, Chestnut Hill, MA (US); Andrew W. Lueck, Austin, TX (US); Paul E. Kitchin, Austin, TX (US); David A. Kaplan, Austin, TX (US)

(72) Inventors: Alexander J. Branover, Chestnut Hill, MA (US); Andrew W. Lueck, Austin, TX (US); Paul E. Kitchin, Austin, TX (US); David A. Kaplan, Austin, TX (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 524 days.

(21) Appl. No.: 13/725,014

(22) Filed: Dec. 21, 2012

(65) Prior Publication Data

US 2014/0181557 A1    Jun. 26, 2014

(51) Int. Cl.  
*G06F 1/32* (2006.01)

(52) U.S. Cl.  
CPC .................................. *G06F 1/3234* (2013.01)

(58) Field of Classification Search  
CPC ................................ G06F 1/32; G06F 1/3203  
USPC .......................... 713/300, 310, 320, 322, 323  
See application file for complete search history.

(56) References Cited

U.S. PATENT DOCUMENTS

| | | | |
|---|---|---|---|
| 8,463,970 B2 * | 6/2013 | Frantz et al. ................... | 710/260 |
| 2007/0260794 A1 * | 11/2007 | Ashish et al. ................... | 710/267 |
| 2009/0164814 A1 * | 6/2009 | Axford et al. .................. | 713/320 |
| 2009/0235260 A1 * | 9/2009 | Branover et al. .............. | 718/102 |
| 2010/0218015 A1 * | 8/2010 | Yarak ............................. | 713/320 |
| 2014/0068302 A1 * | 3/2014 | Falik et al. ..................... | 713/323 |

\* cited by examiner

*Primary Examiner* — Zahid Choudhury

(57) ABSTRACT

A system includes a processor including at least a first core and a local interrupt controller associated with the first core. The first core is operable to store its architectural state prior to entering a first core sleep state, and the processor is operable to receive and implement a request for entering a system sleep state in which the first core is in the first core sleep state and the local interrupt controller is powered down and exit the system sleep state by restoring the local interrupt controller and restoring the saved architectural state of the first core.

20 Claims, 4 Drawing Sheets

METHODS AND APPARATUS RELATED TO PROCESSOR SLEEP STATES

FIELD

The disclosed subject matter relates generally to electronic devices having multiple power states and, more particularly, to methods and apparatus related to processor sleep states.

BACKGROUND

The ever increasing advances in silicon process technology and reduction of transistor geometry makes static power (leakage) a more significant contributor in the power budget of integrated circuit devices, such as processors (CPUs). To attempt to reduce power consumption, some devices have been equipped to enter one or more reduced power states. In a reduced power state, a reduced clock frequency and/or operating voltage may be employed for the device.

For microprocessors, currently known Advanced Configuration and Power Interface (ACPI) and ACPI-based low-power states have been employed to reduce dynamic power consumption and reduce central processing unit (CPU) static power. ACPI is an open industry standard that defines common interfaces for hardware recognition, motherboard and device configuration, and power management. A widely recognized element of ACPI is power management—giving the operating system (OS) control of power management, in contrast with prior models where power management control was mainly under the control of the Basic Input/Output System (BIOS), with limited intervention from the OS. In ACPI, BIOS provides the OS with methods for directly controlling the low-level details of the hardware, providing the OS with nearly complete control over the power saving schemes.

The ACPI standard specifies various groups of states, among them global states, device states, performance states, and processor states. For example, the ACPI standard defines four processor power states, C0-C3. C0 is the operating state. C1 (often referred to as Halt state) is a state in which the processor is not executing instructions, but can (essentially) instantaneously return to an executing state. C2 (often known as Stop-Clock state) is a state in which the processor stops clocks but maintains cache contents and all software-visible state data. Because cache contents are maintained in C2, the processor must still service coherency probes. C3 (often known as Sleep state) is a state in which the processor maintains cache contents and software state, but lowers voltage to a level sufficient to maintain the saved state. While the ACPI standard specifies 4 states (C0-C3), processors can have independently-defined hardware states beyond C3 representing progressively lower power states. Incremental improvements can be made by flushing cache contents so that the core no longer needs to participate in coherency probes (C5 state). The lowest power state is achieved when the processor cache contents and software context are saved and supply voltage is reduced to eliminate leakage. (C6 state).

On the system level, the APCI standard defines various system sleep states. The G0 (S0) state is the working state. G1 is a sleep state that is subdivided into the S1 state (all processor caches are flushed, and the CPU(s) stop executing instructions; power to the CPU rails and RAM is maintained; devices that do not indicate they must remain on may be powered down), the S2 state (CPU rails powered off), the S3 state (commonly referred to as standby, sleep, or suspend to RAM; RAM remains powered), and the S4 state (commonly referred to as hibernation or suspend to disk; all contents of main memory are saved to non-volatile memory such as a hard drive, and is powered down). The G2 state, or S5 state, is similar to a G3 mechanical off state, but some components remain powered so the computer can "wake" from input from the keyboard, clock, modem, LAN, or USB device. A connected standby system sleep, S03, is similar to a system sleep, S3, but maintains network connectivity. Another difference with the S03 state is that it is controlled by hardware or firmware in the processor and is transparent to the operating system, in that the operating system still sees the system as being in an S0 state.

The S3 or S03 states are the lowest sleep states that maintain some functionality, such as memory state. However, the processor states are lost and the processors are subjected to a reset prior to becoming operable. In addition, all processor cores and the graphics processing unit are reset and brought to an operable state. In many cases, the event triggering the wake-up event does not require full system operability.

This section of this document is intended to introduce various aspects of the art that may be related to different aspects of the disclosed subject matter described and/or claimed below. This section provides background information to facilitate a better understanding of the different aspects of the disclosed subject matter. It should be understood that the statements in this section of this document are to be read in this light, and not as admissions of prior art. The disclosed subject matter is directed to overcoming, or at least reducing the effects of, one or more of the problems set forth above.

BRIEF SUMMARY OF EMBODIMENTS

The following presents a simplified summary of the disclosed subject matter in order to provide a basic understanding of some aspects of the disclosed subject matter. This summary is not an exhaustive overview of the disclosed subject matter. It is not intended to identify key or critical elements of the disclosed subject matter or to delineate the scope of the disclosed subject matter. Its sole purpose is to present some concepts in a simplified form as a prelude to the more detailed description that is discussed later.

Some embodiments include a system including a processor including at least a first core and a local interrupt controller associated with the first core. The first core is operable to store its architectural state prior to entering a first core sleep state, and the processor is operable to receive and implement a request for entering a system sleep state in which the first core is in the first core sleep state and the local interrupt controller is powered down and exit the system sleep state by restoring the local interrupt controller and restoring the saved architectural state of the first core. Some embodiments include a computer system including a memory, a processor coupled to the memory, and a power management controller.

Some embodiments include a method that includes storing the architectural state of a first core of a processor. The processor includes a local interrupt controller associated with the first core. The first core is placed into a first core sleep state. The processor is placed into a system sleep state in which the first core is in the first core sleep state and the local interrupt controller is powered down. The system sleep state is exited by restoring the local interrupt controller and restoring the saved architectural state of the first core.

BRIEF DESCRIPTION OF THE DRAWINGS

The disclosed subject matter will hereafter be described with reference to the accompanying drawings, wherein like reference numerals denote like elements, and.

Figure 1:
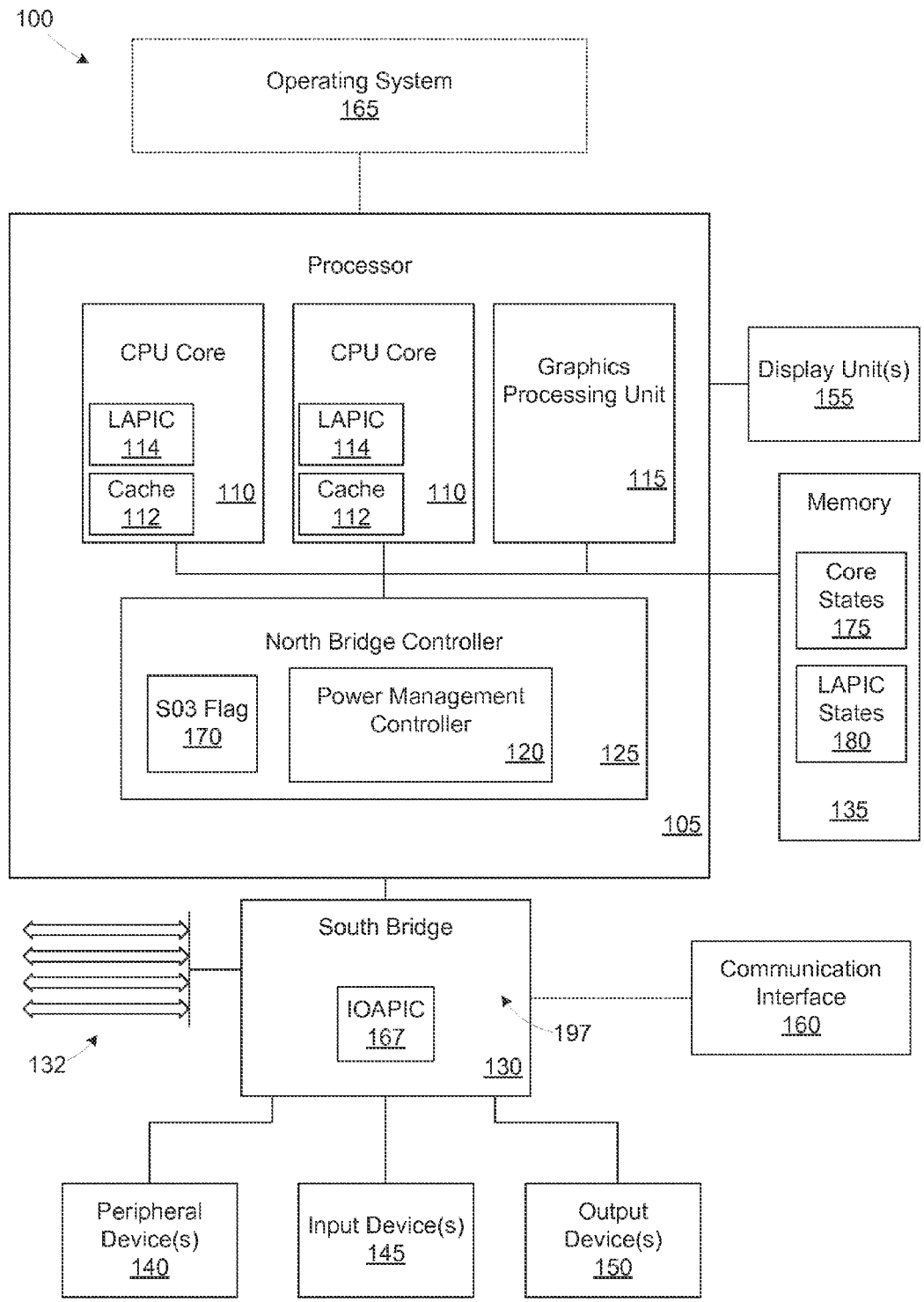
FIG. 1 is a simplified block diagram of a computer system having a power management controller operable to restore the architectural state of a processor after a system sleep state.

While the disclosed subject matter is susceptible to various modifications and alternative forms, specific embodiments thereof have been shown by way of example in the drawings and are herein described in detail. It should be understood, however, that the description herein of specific embodiments is not intended to limit the disclosed subject matter to the particular forms disclosed, but on the contrary, the intention is to cover all modifications, equivalents, and alternatives falling within the spirit and scope of the disclosed subject matter as defined by the appended claims.

DETAILED DESCRIPTION

One or more specific embodiments of the disclosed subject matter will be described below. It is specifically intended that the disclosed subject matter not be limited to the embodiments and illustrations contained herein, but include modified forms of those embodiments including portions of the embodiments and combinations of elements of different embodiments as come within the scope of the following claims. It should be appreciated that in the development of any such actual implementation, as in any engineering or design project, numerous implementation-specific decisions must be made to achieve the developers' specific goals, such as compliance with system-related and business related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure. Nothing in this application is considered critical or essential to the disclosed subject matter unless explicitly indicated as being "critical" or "essential."

The disclosed subject matter will now be described with reference to the attached figures. Various structures, systems and devices are schematically depicted in the drawings for purposes of explanation only and so as to not obscure the disclosed subject matter with details that are well known to those skilled in the art. Nevertheless, the attached drawings are included to describe and explain illustrative examples of the disclosed subject matter. The words and phrases used herein should be understood and interpreted to have a meaning consistent with the understanding of those words and phrases by those skilled in the relevant art. No special definition of a term or phrase, i.e., a definition that is different from the ordinary and customary meaning as understood by those skilled in the art, is intended to be implied by consistent usage of the term or phrase herein. To the extent that a term or phrase is intended to have a special meaning, i.e., a meaning other than that understood by skilled artisans, such a special definition will be expressly set forth in the specification in a definitional manner that directly and unequivocally provides the special definition for the term or phrase.

Referring now to the drawings wherein like reference numbers correspond to similar components throughout the several views and, specifically, referring to FIG. 1, the disclosed subject matter shall be described in the context of a computer system 100 including an accelerated processing unit (APU) 105. The APU 105 includes one or more central processing unit (CPU) cores 110, and their associated caches 112 (e.g., L1, L2, or other level cache memories) and local advanced programmable interrupt controller (LAPIC) 114, a graphics processing unit (GPU) 115, a power management controller 120, and a north bridge (NB) controller 125. The system 100 also includes a south bridge (SB) 130, and system memory 135 (e.g., DRAM). The NB controller 125 provides an interface to the south bridge 130 and to the system memory 135. The LAPICs 114 are responsible for handling CPU-specific interrupt configuration. For example, the LAPIC 114 may contain information for translating events, such as "internal clock" and other "local" interrupt sources, into interrupt vectors. To the extent certain exemplary aspects of the cores 110 and/or one or more cache memories 112 are not described herein, such exemplary aspects may or may not be included in some embodiments without limiting the spirit and scope of the embodiments of the present subject matter as would be understood by one of skill in the art.

In different embodiments, the computer system 100 may interface with one or more peripheral devices 140, input devices 145, output devices 150, and/or display units 155. A communication interface 160, such as a network interface circuit (NIC), may be connected to the south bridge 130 for facilitating network connections using one or more communication topologies (wired, wireless, wideband, etc.). An input/output APIC (IOAPIC) 167 is provided in the SB 130 to facilitate peripheral bus communication. It is contemplated that in various embodiments, the elements coupled to the south bridge 130 may be internal or external to the computer system 100, and may be wired, such as illustrated as being interfaces with the south bridge 130, or wirelessly connected, without affecting the scope of the embodiments of the present subject matter. The display units 155 may be internal or external monitors, television screens, handheld device displays, and the like. The input devices 145 may be any one of a keyboard, mouse, track-ball, stylus, mouse pad, mouse button, joystick, scanner or the like. The output devices 150 may be any one of a monitor, printer, plotter, copier or other output device. The peripheral devices 140 may be any other device which can be coupled to a computer: a CD/DVD drive capable of reading and/or writing to corresponding physical digital media, a universal serial bus ("USB") device, Zip Drive, external floppy drive, external hard drive, phone, and/or broadband modem, router, gateway, access point, and/or the like. To the extent certain exemplary aspects of the computer system 100 are not described herein, such exemplary aspects may or may not be included in various embodiments without limiting the spirit and scope of the embodiments of the present application as would be understood by one of skill in the art. The operation of the system 100 is generally controlled by a software stack 165 including software that interfaces with the various elements of the system 100 (e.g., operating system).

The power management controller 120 may be a circuit or logic configured to perform one or more functions in support of the computer system 100. In the illustrated embodiment of FIG. 1, the power management controller 120 is implemented in the NB controller 125, which may include a circuit (or sub-circuit) configured to perform power management control as one of the functions of the overall functionality of NB controller 125. In some embodiments, the south bridge 130 controls a plurality of voltage rails 132 for providing power to various portions of the system 100. The separate voltage rails 132 allow some elements to be placed into a sleep state while others remain powered. For example, during an S3 system sleep state, the voltage rail 132 powering the memory 135 is active, but voltage rail 132 powering the processor 105 is powered down.

In some embodiments, the circuit represented by the NB controller 125 may be implemented as a distributed circuit, in which respective portions of the distributed circuit may be configured in one or more of the elements of the system 100, such as the processor cores 110, but operating on separate voltage rails 132, that is, using a different power supply than the section or sections of the cores 110 functionally distinct from the portion or portions of the distributed circuit. The separate voltage rails 132 may thereby enable each respective portion of the distributed circuit to perform its functions even when the rest of the processor core 110 or other element of the system 100 is in a reduced power state. This power independence enables embodiments that feature a distributed circuit, distributed controller, or distributed control circuit performing at least some or all of the functions performed by NB controller 125 shown in FIG. 1.

In the illustrated embodiment, the power management controller 120 receives C-state requests from the software stack 165. In other embodiments the software stack 165 may specify more than two processor states. The power management controller 120 applies the actual power actions to the processors. The power management controller 120 decides which of the states to implement based on factors such as interrupt rate, direct memory access (DMA) activity, etc. For example, the software stack 165 may request a lower power state (i.e., not a sleep state), but the power management controller 120 may instead elect to place the processor in a halt state based on the system activity. Hence, if the power management controller 120 identifies a higher system activity, the shallower halt state is applied. Thus, the power state requested by the software stack 165 does not necessarily match the actual state of the processor 110, 115 that is implemented by the power management controller 120.

The power management controller 120 also controls the transitioning of the system 100 out of a system sleep state (e.g., S3 or S03) to facilitate the restoration of the architectural state of one or more cores 110 without requiring a reset. Conventional system sleep states exits result in the resetting of the cores 110 and GPU 115, thereby flushing any previously saved architectural state information.

Figure 2:
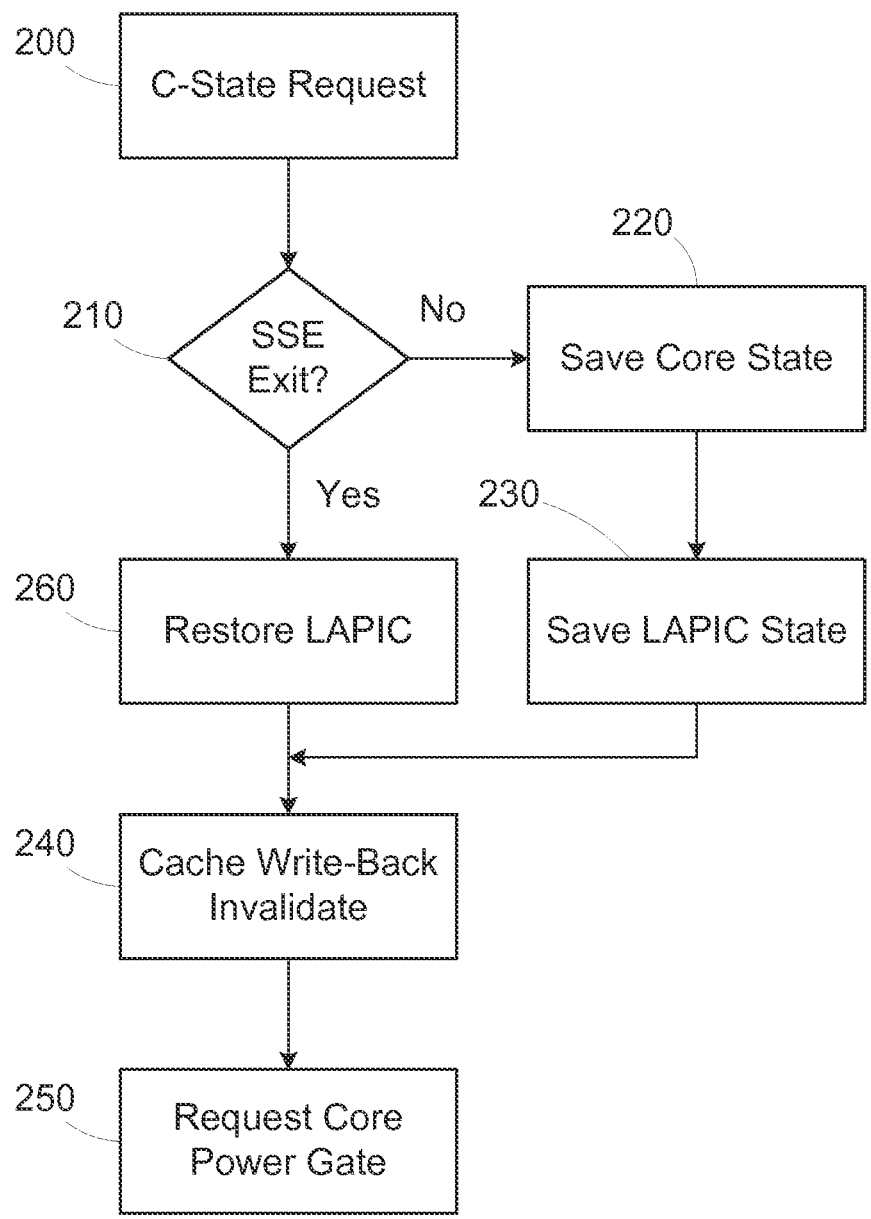
FIG. 2 is a simplified diagram of a method for placing a core of FIG. 1 into a sleep state.
Figure 3:
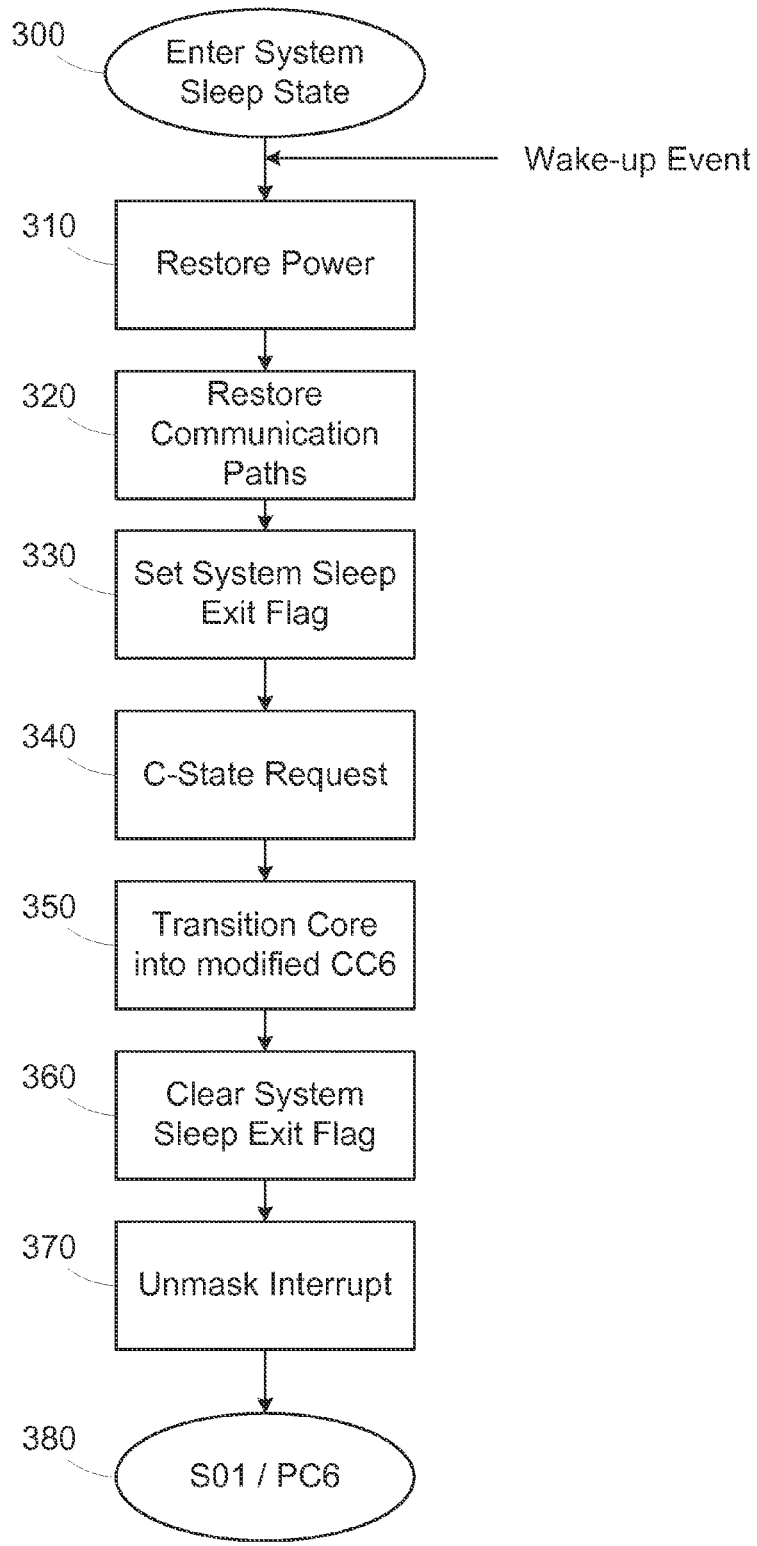
FIG. 3 is a simplified diagram of a method employed by the power management controller of FIG. 1 to restore the system from a system sleep state.

Turning now to FIGS. 2-3, simplified flow diagrams are provided to illustrate how the cores 110 and power management controller 120 transitions into and out of a system sleep state to restore one or more cores 110 upon exiting the system sleep state. Prior to implementing a system sleep, the cores 110 are placed in a core sleep state (CC6) based on system inactivity, as illustrated in FIG. 2. After all cores 110 are inactive, the software stack 165 (e.g., S3) or the power management controller 120 (e.g., S03) may consider placing the system into a system sleep state. In block 200, the power management controller 120 issues a C-state request to place a core 110 into a core sleep state (CC6). In block 210, it is determined if a system sleep exit flag 170 (see FIG. 1) has been set. For the following example, it is assumed that the system is not yet in a system sleep state, so the flag 170 is not set. Based on the system sleep exit flag 170, the core 110 is placed into a CC6 state by saving the core state 175 in block 220 and saving the LAPIC state 180 in block 230. A cache-write back invalidate is implemented in block 240 to flush the cache 112, and a request to the south bridge 130 is issued in block 250 to power gate the core 110. This may be repeated for each core 110. Power gating the core 110 isolates it from the voltage rail 132 but does not ramp down the rail 132.

After all cores 110 are inactive, the power management controller 120 may place the system into a system sleep state, where the power rail 132 for the cores 110 is powered down. FIG. 3 illustrates how the power management controller 120 manages the exit from the system sleep state. The system sleep state is entered in block 300. A wake-up event triggers the exit from the system sleep state. The south bridge 130 intercepts the wake-up interrupt and masks it until power and the system communication paths can be restored. In some embodiments, wake-up event may include the pressing of a power button, an incoming network message, a low battery notification, etc.

In block 310, power is restored by reconnecting one or more voltage rails 132. For internal clocks, phase lock loops (PLLs) are also be reset and locked. In block 320, the communication paths are restored. In some embodiments, this includes the south bridge 130 restoring the IOAPIC 167 and the NB controller 125 enabling the memory path and the IO/CPU path. In some embodiments, where the sleep state is an S3 state, the network connectivity may also be restored by the south bridge 130. In block 330, the power management controller 120 sets the system sleep exit flag 170, designating that the system is to exit the system sleep and restore one or more cores 110 without requiring a reset. In some embodiments, the power management controller 120 may set the system sleep exit flag 170 as it enters the system sleep state, as opposed to during the wake-up.

In block 340, the power management controller 120 issues a C-State request to one or more cores 110. In some embodiments, only one core 110 may be restored. In some embodiments, all cores 110 may be restored. The C-state request causes each core 110 being restored to go through a modified CC6 shutdown in block 350. The core 110 follows the flow starting in block 200 of FIG. 2. However, because the system sleep exit (SSE) flag 170 is set in block 210, the LAPIC 114 is restored in block 260 without saving the core state. Because the core state is not written, the previously stored core state 175, representing the core state prior to the core sleep, is available for restoring the core 110. The cache-write back invalidate is implemented in block 240 to flush the cache 112, and a request to the south bridge 130 is issued in block 250 to power gate the core. Although the core 110 is power gated, power to the voltage rail 132 is still present. Since, the LAPIC 114 was restored, the core 115 is in a CC6 state, but the rest of the system parts have been restored. The SSE flag 170 is cleared in block 360, and the interrupt associated with the wake-up event is unmasked by the power management controller 120 and allowed to propagate to the APICs 114, 167. From a system standpoint, it appears that the system in an S0 state and the processor 105 is in a package C6 (PC6) state, without having been placed into an S3 or S03 state, as shown in block 380.

The interrupt causes one or more cores 110 to wake up and restore their previously stored architectural states 175. This procedure for exiting a system sleep state allows the core 110 to be restored without a reset and loss of its core state. Restoring the functionality of the processor 105 in this manner reduces wake-up latency. Also, the procedure allows the functionality of one core 110 to be restored to service the interrupt without requiring all cores 110 to be restored. If multiple cores 110 are to be restored, the power management controller 120 may set the SSE flag 170 prior to restoring the additional cores 110 to allow their LAPICs 114 to be restored and then their saved architectural states 175 to be restored.

Figure 4:
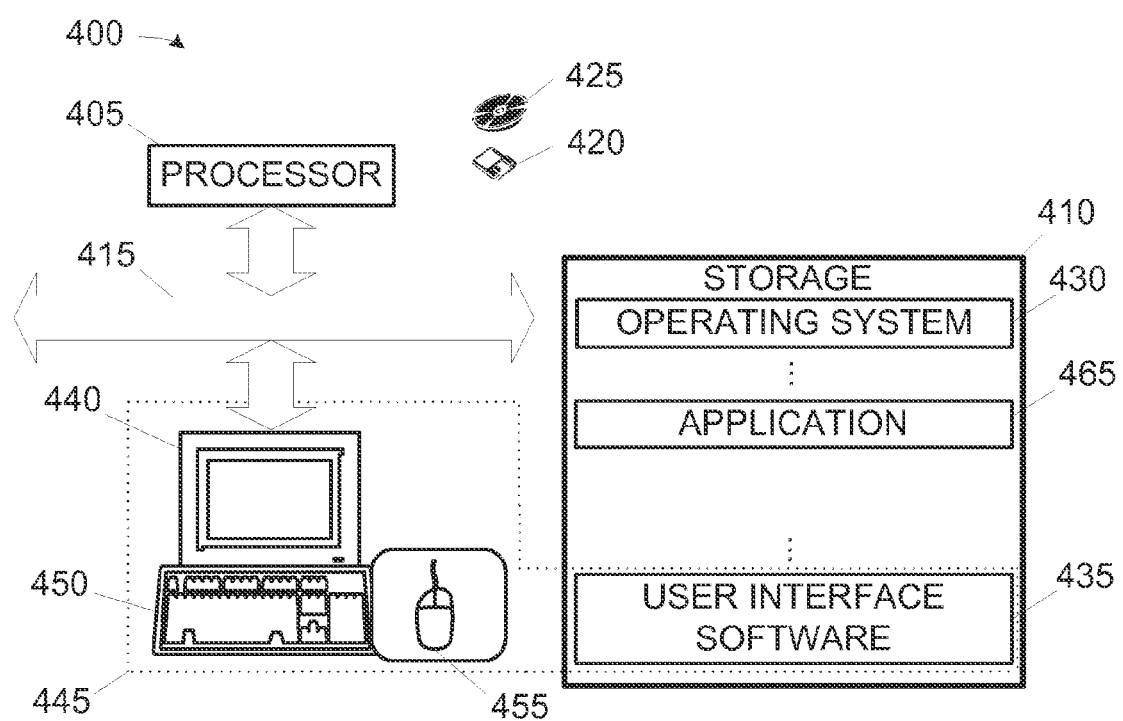
FIG. 4 is a simplified diagram of a computing apparatus that may be programmed to direct the fabrication of a processor in the system of FIG. 1.

FIG. 4 illustrates a simplified diagram of selected portions of the hardware and software architecture of a computing apparatus 400 such as may be employed in some aspects of the present subject matter. The computing apparatus 400 includes a processor 405 communicating with storage 410 over a bus system 415. The storage 410 may include a hard disk and/or random access memory ("RAM") and/or removable storage, such as a magnetic disk 420 or an optical disk 425. The storage 410 also stores an operating system 430, user interface software 435, and an application 465. The user interface software 435, in conjunction with a display 440, implements a user interface 445. The user interface 445 may include peripheral I/O devices such as a keypad or keyboard 450, mouse 455, etc. The processor 405 runs under the control of the operating system 430, which may be practically any operating system known in the art. The application 465 is invoked by the operating system 430 upon power up, reset, user interaction, etc., depending on the implementation of the operating system 430. The application 465, when invoked, performs a method of the present subject matter. The user may invoke the application 465 in conventional fashion through the user interface 445. Note that although a stand-alone system is illustrated, there is no need for the data to reside on the same computing apparatus 400 as the application 465 by which it is processed. Some embodiments of the present subject matter may therefore be implemented on a distributed computing system with distributed storage and/or processing capabilities.

It is contemplated that, in some embodiments, different kinds of hardware descriptive languages (HDL) may be used in the process of designing and manufacturing very large scale integration circuits (VLSI circuits), such as semiconductor products and devices and/or other types semiconductor devices. Some examples of HDL are VHDL and Verilog/Verilog-XL, but other HDL formats not listed may be used. In one embodiment, the HDL code (e.g., register transfer level (RTL) code/data) may be used to generate GDS data, GDSII data and the like. GDSII data, for example, is a descriptive file format and may be used in different embodiments to represent a three-dimensional model of a semiconductor product or device. Such models may be used by semiconductor manufacturing facilities to create semiconductor products and/or devices. The GDSII data may be stored as a database or other program storage structure. This data may also be stored on a computer readable storage device (e.g., storage 410, disks 420, 425, solid state storage, and the like). In one embodiment, the GDSII data (or other similar data) may be adapted to configure a manufacturing facility (e.g., through the use of mask works) to create devices capable of embodying various aspects of the instant invention. In other words, in various embodiments, this GDSII data (or other similar data) may be programmed into the computing apparatus 400, and executed by the processor 405 using the application 465, which may then control, in whole or part, the operation of a semiconductor manufacturing facility (or fab) to create semiconductor products and devices. For example, in one embodiment, silicon wafers containing a processor 105 of FIG. 1 may be created using the GDSII data (or other similar data).

The particular embodiments disclosed above are illustrative only, as the disclosed subject matter may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the disclosed subject matter. Accordingly, the protection sought herein is as set forth in the claims below.

We claim:

1. A system, comprising:
a processor comprising:
at least a first core; and
a local interrupt controller associated with the first core, wherein the first core is operable to store its architectural state to a memory prior to entering a first core sleep state, and
wherein the processor is operable to receive and implement a request for entering a system sleep state in which the first core is in the first core sleep state and the local interrupt controller is powered down and exit the system sleep state by restoring the local interrupt controller, placing the first core in a second core sleep state, and subsequently restoring the saved architectural state of the first core.

2. The system of claim 1, further comprising logic operable to receive an interrupt for restoring the processor from the system sleep state, mask the interrupt, and release the interrupt to the processor responsive to the local interrupt controller being restored.

3. The system of claim 2, wherein the logic is operable to, responsive to the interrupt, restore power to the processor and the first core and restore a communication path between the memory and the processor, wherein the processor further comprises a power management controller operable to place the first core into the second core sleep state without re-saving its architectural state.

4. The system of claim 3, wherein the processor is operable to restore the local interrupt controller while placing the first core into the second core sleep state.

5. The system of claim 3, further comprising a memory operable to store the architectural state of the first core, wherein the power management controller is operable to receive the released interrupt and wake up the first core from the second core sleep state responsive to the released interrupt, and the first core is operable to retrieve its architectural state from the memory responsive to the wake up.

6. The system of claim 2, wherein the logic comprises a south bridge operable to provide power to the processor and the first core according to their sleep states.

7. The system of claim 1, wherein the processor further comprises a power management controller operable send power state requests to the first core to control its power state, wherein the power management controller is operable to send a first power state request to place the first core into the first core sleep state and set a system sleep exit flag responsive to the system being placed into the system sleep state.

8. The system of claim 7, wherein the power management controller is operable to set the system sleep exit flag prior to the system entering the system sleep state.

9. The system of claim 7, wherein the processor is operable to store the architectural state and a state of the local interrupt controller in the memory responsive to receiving the first power state request with the system sleep exit flag not set.

10. The system of claim 9, wherein the processor is operable to restore the saved state of the local interrupt controller responsive to receipt of a second core power state request with the system sleep exit flag set.

11. A method, comprising:
storing an architectural state of a first core of a processor to a memory, the processor including a local interrupt controller associated with the first core;
placing the first core into a first core sleep state;
placing the processor into a system sleep state in which the first core is in the first core sleep state and the local interrupt controller is powered down; and exiting the system sleep state by restoring the local interrupt controller, placing the first core into a second core sleep state, and restoring the saved architectural state of the first core.

12. The method of claim 11, further comprising:
receiving an interrupt for restoring the processor from the system sleep state;
masking the interrupt; and
releasing the interrupt to the processor responsive to the local interrupt controller being restored.

13. The method of claim 12, further comprising:
responsive to the interrupt, restoring power to the processor and the first core and restoring a communication path between the memory and the processor; and
placing the first core into the second core sleep state without re-saving its architectural state.

14. The method of claim 13, further comprising restoring the local interrupt controller while placing the first core into the second core sleep state.

15. The method of claim 13, further comprising:
receiving the released interrupt;
receiving a wake-up request for restoring the first core from the second core sleep state responsive to the released interrupt; and
retrieve the architectural state of the first core responsive to the wake-up request.

16. The method of claim 11, further comprising:
sending a first power state request to the first core to place the first core into the first core sleep state; and
setting a system sleep exit flag responsive to the system being placed into the system sleep state.

17. The method of claim 16, further comprising setting the system sleep exit flag prior to the processor entering the system sleep state.

18. The method of claim 17, further comprising storing the architectural state and a state of the local interrupt controller in a memory responsive to receiving the first power state request with the system sleep exit flag not set.

19. The system of claim 18, further comprising restoring the saved state of the local interrupt controller responsive to receipt of a second core power state request with the system sleep exit flag set.

20. A method comprising:
receiving an interrupt at a processor while the processor is in a system sleep state; and
in response to the interrupt:
placing a processor core of the processor in a core sleep state;
restoring a state of a local interrupt controller of the processor; and
processing the interrupt at the local interrupt controller, wherein processing the interrupt includes transitioning the processor core from the core sleep state to an active state.

* * * * *